(12) United States Patent
Bouazizi et al.

(10) Patent No.: US 10,559,126 B2
(45) Date of Patent: Feb. 11, 2020

(54) 6DOF MEDIA CONSUMPTION ARCHITECTURE USING 2D VIDEO DECODER

(71) Applicant: Samsung Electronics Co., Ltd., Suwon-si (KR)

(72) Inventors: Imed Bouazizi, Frisco, TX (US); Youngkwon Lim, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/155,675

(22) Filed: Oct. 9, 2018

(65) Prior Publication Data

US 2019/0114830 A1    Apr. 18, 2019

Related U.S. Application Data

(60) Provisional application No. 62/571,952, filed on Oct. 13, 2017, provisional application No. 62/618,311, (Continued)

(51) Int. Cl.
| | |
|---|---|
| *G06T 17/10* | (2006.01) |
| *G06T 19/00* | (2011.01) |
| *G06F 3/01* | (2006.01) |
| *H04N 5/32* | (2006.01) |
| *G06T 15/04* | (2011.01) |

(Continued)

(52) U.S. Cl.
CPC ............. *G06T 17/10* (2013.01); *G06F 3/011* (2013.01); *G06T 15/005* (2013.01); *G06T 15/04* (2013.01); *G06T 19/003* (2013.01); *H04N 5/23238* (2013.01); *G06T 2210/61* (2013.01)

(58) Field of Classification Search
None
See application file for complete search history.

(56) References Cited

U.S. PATENT DOCUMENTS 9,773,350 B1 *   9/2017   Crosby ................. H04N 5/247
2016/0086353 A1   3/2016   Lukac et al.
(Continued)

OTHER PUBLICATIONS

Mary-Luc Champel/Rob Koene, "Requirements MPEG-I phase 1b", ISO/IEC JTC1/SC29/WG11 N17069, Jul. 2017, 4 pages.
(Continued)

*Primary Examiner* — Edward Martello

(57) ABSTRACT

Method and apparatus for encoding, decoding and rendering 3D media content are provided. An apparatus for rendering three-dimensional (3D) media content includes a communication interface configured to receive a multimedia stream, and one or more processors operably coupled to the communication interface, the one or more processors configured to parse the multimedia stream into 2D video bitstreams including geometry frames and texture frames, 2D to 3D conversion metadata for rendering 3D points from 2D frames, and scene description metadata describing 6 degree of freedom (6DoF) relationships among objects in a 6DoF scene, decode the 2D video streams including geometry data and texture data to generate 2D pixel data, covert the 2D pixel data into 3D voxel data using the 2D to 3D conversion metadata; and generate the 6DoF scene from 3D voxel data using the scene description metadata.

20 Claims, 8 Drawing Sheets

Related U.S. Application Data filed on Jan. 17, 2018, provisional application No. 62/663,419, filed on Apr. 27, 2018.

(51) Int. Cl.
*G06T 15/00* (2011.01)
*H04N 5/232* (2006.01)

(56) References Cited

U.S. PATENT DOCUMENTS

2017/0177980 A1\* 6/2017 Alibay ................. G06K 9/6289
2018/0190011 A1\* 7/2018 Platt ..................... G06T 15/506

OTHER PUBLICATIONS

Nir Shabat et al., "Real-Time 2 D to 3 D Conversion from H.264 Video Compression", 2015, 15 pages.

Eric Yip, "MPEG-I Standardization: Immersive Media", GISC 2017, Nov. 29, 2017, 21 pages.

Ho Yo Sung, "MPEG-I standard and 360 degree video content generation", The Magazine of the IEEE, vol. 44, No. 8, Aug. 2017, 8 pages.

Ho Yo Sung, "Immersive media using 360-degree video Standardization Technology Trends", TTA Journal ICT Standard & Certification, ISSN 1975-5112, vol. 172, Jul. 2017, 10 pages.

International Search Report dated Jan. 28, 2019 in connection with International Patent Application No. PCT/KR2018/012017, 4 pages.

Written Opinion of the International Searching Authority dated Jan. 28, 2019 in connection with International Patent Application No. PCT/KR2018/012017, 4 pages.

Champel et al. (Eds.), "Working Draft 0.3 of TR: Technical Report on Architectures for Immersive Media", ISO/IEC JTC1/SC29/WG11/w17067, Jul. 2017, 46 pages.

\* cited by examiner

6DOF MEDIA CONSUMPTION ARCHITECTURE USING 2D VIDEO DECODER

CROSS-REFERENCE TO RELATED APPLICATION AND CLAIM OF PRIORITY

This application claims priority under 35 U.S.C. § 119(e) to U.S. Provisional Patent Application No. 62/571,952 filed on Oct. 13, 2017; U.S. Provisional Patent Application No. 62/618,311 filed on Jan. 17, 2018; and U.S. Provisional Patent Application No. 62/663,419 filed on Apr. 27, 2018. The above-identified provisional patent application is hereby incorporated by reference in its entirety.

TECHNICAL FIELD

This disclosure relates generally to methods and apparatus for rendering three-dimensional (3D) content. More specifically, this disclosure relates to methods and apparatus for encoding, decoding or rendering immersive 3D media.

BACKGROUND

Three hundred sixty degree (360°) video is emerging as a new way of experiencing immersive video due to the ready availability of powerful handheld devices such as smartphones. 360° video enables immersive "real life," "being there" experience for consumers by capturing the 360° view of the world. Users can interactively change their viewpoint and dynamically view any part of the captured scene or object they desire. Display and navigation sensors track head movement in real-time to determine the region of the 360° video that the user wants to view. 360° video provides a three Degrees of Freedom (3DoF) immersive experience. (6DoF) is the next level of immersive experience where in the user can turn his head as well as move around in a virtual/augmented environment. Multimedia data that is 3-dimensional in nature, such as point clouds, is needed to provide 6DoF experience.

Point clouds and meshes are a set of three-dimensional (3D) points that represent a model of a surface of an object or a scene. Point clouds are common in a variety of applications such as gaming, 3D maps, visualizations, medical applications, augmented reality (AR), virtual reality (VR), autonomous driving, multi-view replay, 6DoF immersive media, to name a few. Point clouds, if uncompressed, generally require a large amount of bandwidth for transmission. Hence, the bitrate requirements are higher, necessitating the need for compression prior to transmission of a point cloud. Compression hardware and processes of point clouds are different than traditional compression hardware and processes for traditional two-dimensional (2D) multimedia.

SUMMARY

This disclosure provides method and apparatus for encoding, decoding and rendering 3D media content.

In one embodiment, an apparatus for rendering three-dimensional (3D) media content includes a communication interface configured to receive a multimedia stream, and one or more processors operably coupled to the communication interface, the one or more processors configured to parse the multimedia stream into 2D video bitstreams including geometry frames and texture frames, 2D to 3D conversion metadata for rendering 3D points from 2D frames, and scene description metadata describing 6 degree of freedom (6DoF) relationships among objects in a 6DoF scene, decode the 2D video streams including geometry data and texture data to generate 2D pixel data, covert the 2D pixel data into 3D voxel data using the 2D to 3D conversion metadata; and generate the 6DoF scene from 3D voxel data using the scene description metadata.

In another embodiment, a method for rendering three-dimensional (3D) media content includes receiving a multimedia stream, parsing the multimedia stream into 2D video bitstreams including geometry frames and texture frames, 2D to 3D conversion metadata for rendering 3D points from 2D frames, and scene description metadata describing 6 degree of freedom (DoF) relationships among objects in a 6DoF scene, decoding the 2D video streams including the geometry frames and texture frames to generate 2D pixel data, converting the 2D pixel data into 3D voxel data using the 2D to 3D conversion metadata; and generating the 6DoF scene from 3D voxel data using the scene description metadata.

In yet another embodiment, an apparatus for encoding three-dimensional (3D) media content includes one or more processors configured to obtain a 6 degree of freedom (DoF) scene, generate one or more bitstreams by simplifying the 6 DoF scenes. The one or more bitstreams comprising 2D video bitstreams including geometries and textures of each point of the 6DoF scene, 2D to 3D conversion metadata for rendering 3D voxels from 2D pixels, and scene description metadata for describing 6 DoF relationships among objects in the 6 DoF scene, and a communication interface operably coupled to the one or more processor, wherein the communication interface is configured to transmit the one or more bitstreams to a client device.

In yet another embodiment, an apparatus for encoding three-dimensional (3D) media content includes a communication interface configured to receive a multimedia stream including 6DoF scenes, a pre-renderer configured to convert the 6DoF scenes into a lower level of DoF scenes, a encoder configured to encode lower level of DoF scenes into video data, and the communication interface further configured to transmit a bitstream including the encoded video data.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read-only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
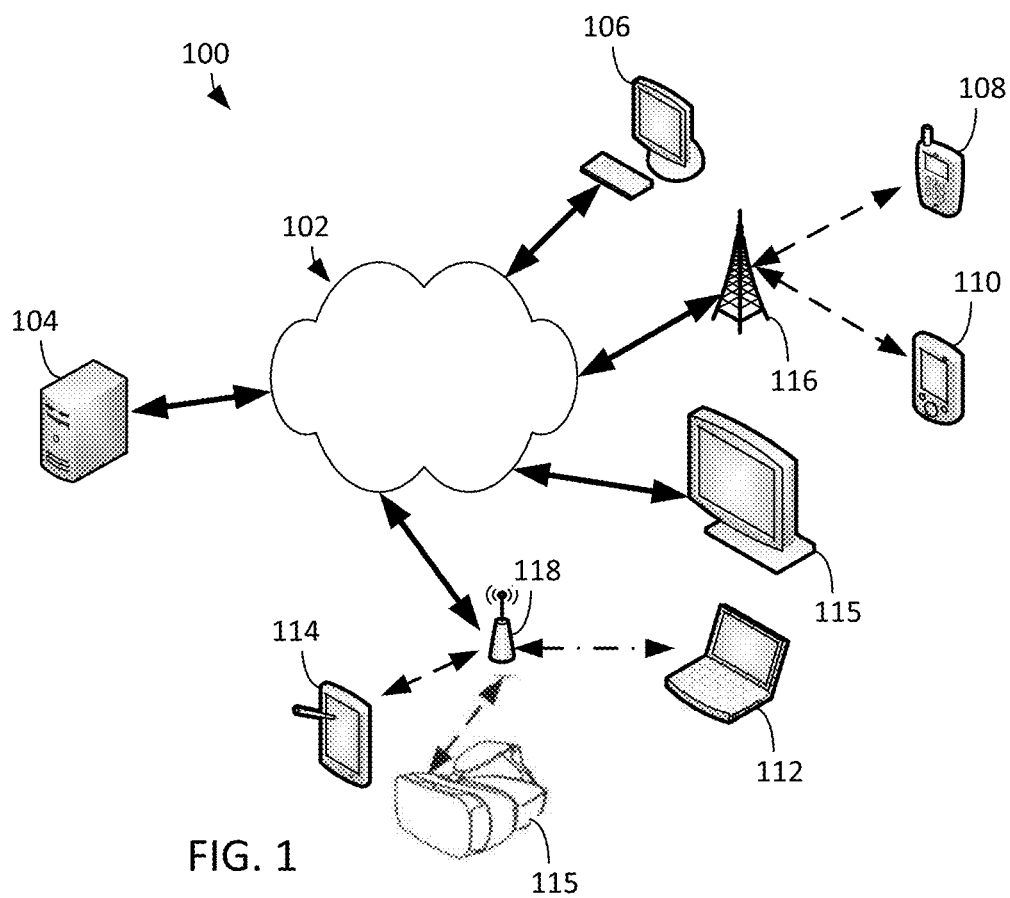
FIG. 1 illustrates an example communication system in accordance with embodiments of the present disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Virtual reality (VR) is a rendered version of a visual and audio scene. The rendering is designed to mimic the visual and audio sensory stimuli of the real world as naturally as possible to an observer or user as they move within the limits defined by the application. For example, VR places a user into immersive worlds that interact with their head movements. At the video level, VR is achieved by providing a video experience that covers as much of the field of view (FOV) as possible together with the synchronization of the viewing angle of the rendered video with the head movements. Although many different types of devices are able to provide such an experience, head-mounted displays are the most popular. Typically, head-mounted displays rely either on dedicated screens integrated into the device and running with external computers (tethered) or on a smartphone inserted into the HMD (untethered). The first approach utilizes lightweight screens and benefiting from a high computing capacity. In contrast, the smartphone-based systems utilizes higher mobility and can be less expensive to produce. In both instances, the video experience is generated the same.

A point cloud is a 3-D representation of an object that is similar to VR. Similarly, a point mesh is a 3-D representation of an object that is similar to VR. Generally, a point cloud is a collection of data points defined by a coordinate system. For example, in a 3-D Cartesian coordinate system, each point of a point cloud is identified by three coordinates, that of X, Y, and Z. When each point is identified by the three coordinates, a precise location in 3-D space is identified, relative to an origin point where the X, Y, and Z axes intersect. The points of a point cloud often represent the external surface of the object. Each point of a point cloud is defined by three coordinates and some attributes such as color, texture coordinates, intensity, normal, reflectance, and the like.

Similarly, a 3-D mesh is a 3-D representation of an object that is similar to a point cloud as well as VR. A 3-D mesh illustrates the external structure of an object that is built out of polygons. For example, a 3-D mesh is a collection of verities, edges, and faces that define the shape of an object. For another example, meshes (or point clouds) can be rendered on spherical coordinate system and where each point is displayed throughout a sphere. In certain embodiments, each point can be located in the X, Y, Z coordinates within the sphere and texture coordinates U and V indicate a location of texture of the image. When the point cloud is rendered, the vertices of the mesh, the corresponding texture coordinate, and the texture image are inputted into a graphical processing unit which maps the mesh onto the 3-D geometry. The user can be placed at the center of the virtual sphere and sees a portion of the 360° scene corresponding to the viewport. In certain embodiments, alternative shapes can be used instead of a sphere such as a cube, an icosahedron, an octahedron, and the like.

Point clouds and meshes are commonly used in a variety of applications, including gaming, 3-D mapping, visualization, medicine, augmented reality, VR, autonomous driving, multiview replay, 6 degrees of freedom immersive media, to name a few.

While 2D monoscope or stereoscopic video plays a role in 3 degree of freedom (DoF) or 3DoF+ media, in 6DoF media a new type of 3D volumetric media, e.g., point cloud or light field will be heavily used and additional rendering related information will be required. Therefore, the architectures for 6DoF media will be different from that of 3DoF or 3DoF+ media.

This scope of the disclosure is not limited to MPEG-I contents or point cloud contents, but also includes a combination of MPEG-I contents or point cloud contents.

In particular, this disclosure provides architectures for utilizing MPEG-I data, point cloud data or a combination of MPEG-I data and point cloud data for 6DoF media experience, which will enable fast and power efficient rendering of 6DoF media. The architectures for utilizing MPEG-I data, point cloud data or the combination of MPEG-I data and point cloud data for 6DoF media experience can be implemented by using 2D planar video decoder. Thus, this disclosure allows the 6DoF media consumption with a conventional multimedia processor with a 2D video decoder and a GPU.

FIG. 1 illustrates an example computing system 100 according to this disclosure. The embodiment of the system 100 shown in FIG. 1 is for illustration only. Other embodiments of the system 100 can be used without departing from the scope of this disclosure.

The system 100 includes network 102 that facilitates communication between various components in the system 100. For example, network 102 can communicate Internet Protocol (IP) packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

The network 102 facilitates communications between a server 104 and various client devices 106-116. The client devices 106-116 may be, for example, a smartphone, a tablet computer, a laptop, a personal computer, a wearable device, or a head-mounted display (HMD). The server 104 can represent one or more servers. Each server 104 includes any suitable computing or processing device that can provide computing services for one or more client devices. Each server 104 could, for example, include one or more processing devices, one or more memories storing instructions and data, and one or more network interfaces facilitating communication over the network 102. As described in more detail below, the server 104 transmits a point cloud to one or more users.

Each client device 106-116 represents any suitable computing or processing device that interacts with at least one server or other computing device(s) over the network 102. In this example, the client devices 106-116 include a desktop computer 106, a mobile telephone or mobile device 108 (such as a smartphone), a personal digital assistant (PDA) 110, a laptop computer 112, a tablet computer 114, and a HMD 116. However, any other or additional client devices could be used in the system 100.

In this example, some client devices 108-116 communicate indirectly with the network 102. For example, the client devices 108 and 110 (mobile devices 108 and PDA 110, respectively) communicate via one or more base stations 118, such as cellular base stations or eNodeBs (eNBs). Mobile device 108 includes smartphones. Also, the client devices 112, 114, and 116 (laptop computer, tablet computer, and HMD, respectively) communicate via one or more wireless access points 120, such as IEEE 802.11 wireless access points. As described in more detail below the HMD 116 can display a 360° view of a point cloud. Note that these are for illustration only and that each client device 106-116 could communicate directly with the network 102 or indirectly with the network 102 via any suitable intermediate device(s) or network(s). In certain embodiments, server 104 or any client device 106-114 can be used to compress a point cloud and transmit the data to another client device such as any client device 106-116.

In certain embodiments, the mobile device 108 (or any other client device 106-116) can transmit information securely and efficiently to another device, such as, for example, the server 104. The mobile device 108 (or any other client device 106-116) can function as a VR display when attached to a headset via brackets, and function similar to HMD 116. The mobile device 108 (or any other client device 106-116) can trigger the information transmission between itself and server 104.

Although FIG. 1 illustrates one example of a system 100, various changes can be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

The processes and systems provided in this disclosure allow for a client device 106-116 or the server 104 to compress, transmit, receive, render a point cloud, or a combination thereof. For example, the server 104 can then compress and transmit the point cloud data to client devices 106-116. For another example, any client device 106-116 can compress and transmit point cloud data to any client devices 106-116.

Figure 2:
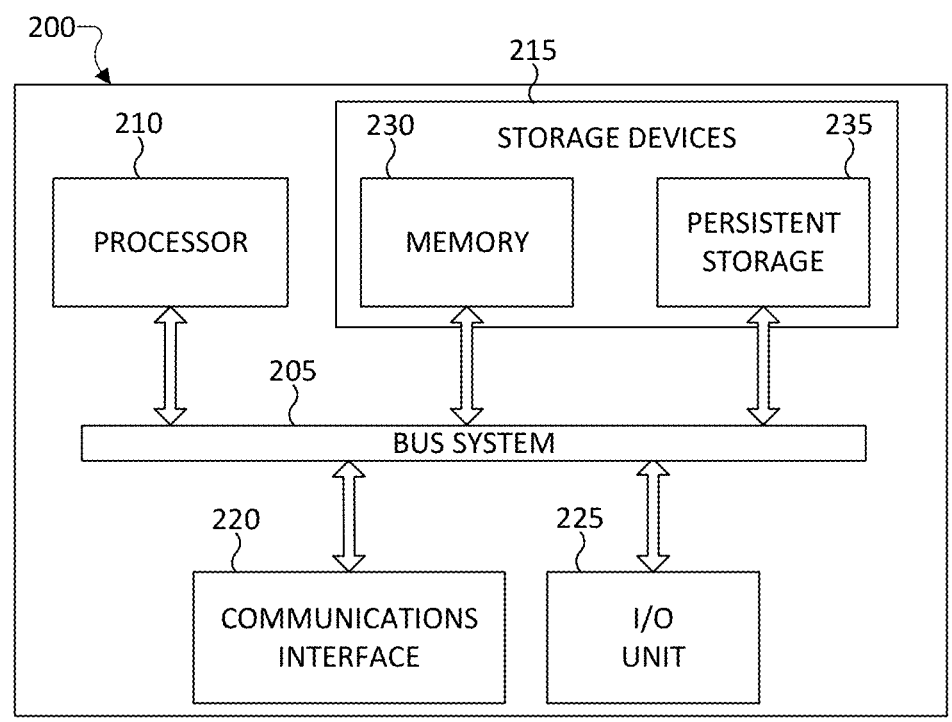
FIG. 2 illustrates an example electronic device in accordance with an embodiment of this disclosure.
Figure 3:
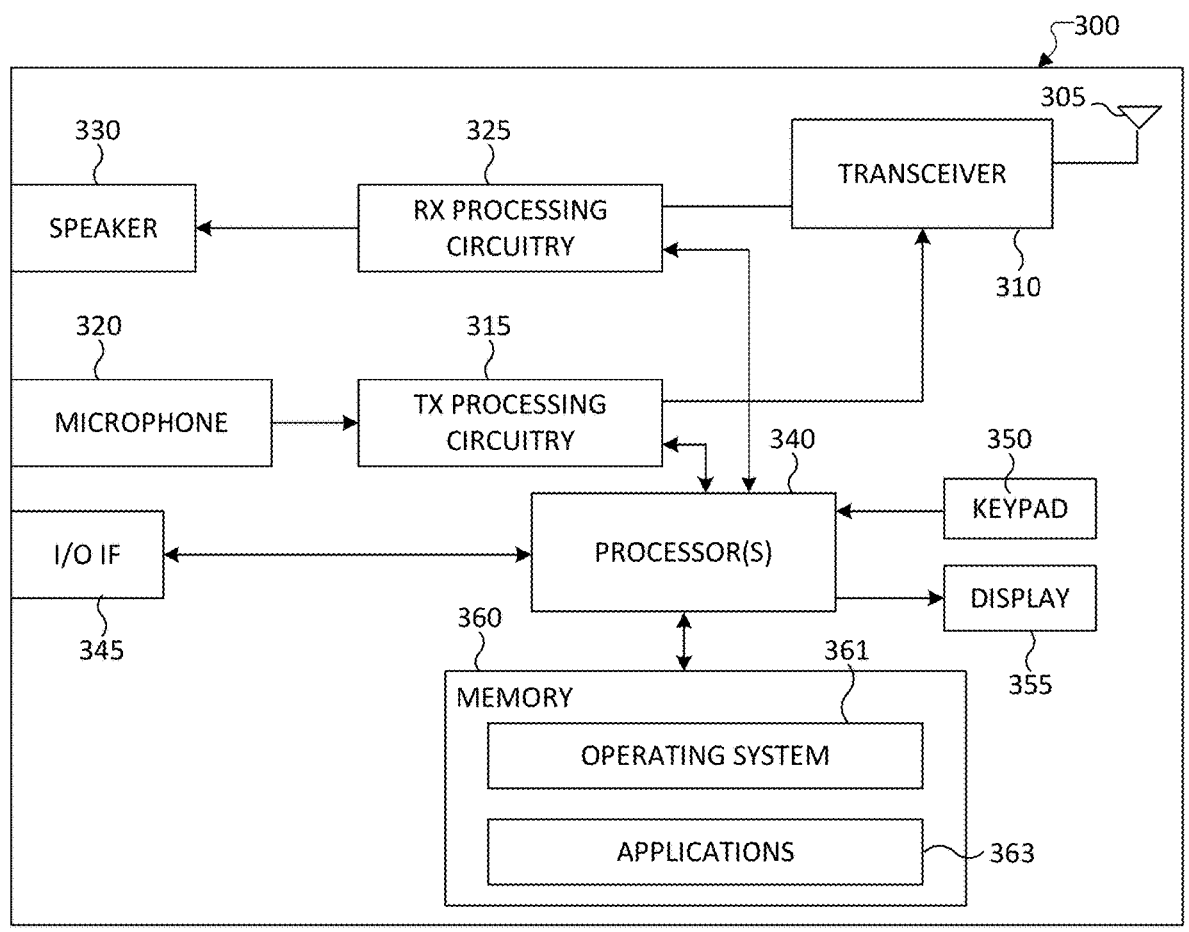
FIG. 3 illustrates an example electronic device in accordance with an embodiment of this disclosure.

FIGS. 2 and 3 illustrate example devices in a computing system in accordance with an embodiment of this disclosure. In particular, FIG. 2 illustrates an example server 200, and FIG. 3 illustrates an example electronic device 300. The server 200 could represent the server 104 of FIG. 1, and the electronic device 300 could represent one or more of the client devices 106-116 of FIG. 1.

Server 200 can represent one or more local servers, one or more compression servers, or one or more encoding servers. As shown in FIG. 2, the server 200 includes a bus system 205 that supports communication between at least one processor(s) 210, at least one storage device(s) 215, at least one communications interface 220, and at least one input/output (I/O) unit 225.

The processor 210 executes instructions that can be stored in a memory 230. The instructions stored in memory 230 can include instructions for decomposing a point cloud, compressing a point cloud. The instructions stored in memory 230 can also include instructions for encoding a point cloud in order to generate a bitstream. The instructions stored in memory 230 can also include instructions for rendering the point cloud on an omnidirectional 360° scene, as viewed through a VR headset, such as HMD 116 of FIG. 1. The processor 210 can include any suitable number(s) and type(s) of processors or other devices in any suitable arrangement. Example types of processor(s) 210 include microprocessors, microcontrollers, digital signal processors, field programmable gate arrays, application specific integrated circuits, and discrete circuitry.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random access memory or any other suitable volatile or non-volatile storage device(s). The persistent storage 235 can contain one or more components or devices supporting longer-term storage of data, such as a ready-only memory, hard drive, flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s).

The I/O unit 225 allows for input and output of data. For example, the I/O unit 225 can provide a connection for user input through a keyboard, mouse, keypad, touchscreen, motion sensors, or any other suitable input device. The I/O unit 225 can also send output to a display, printer, or any other suitable output device.

In certain embodiments, server 200 implements the compression of a point cloud, as will be discussed in greater detail below. In certain embodiments, server 200 generates multiple 2-D frames that correspond to the three dimensions of the point cloud. In certain embodiments, server 200 maps the three dimensions of a point cloud into 2-D. In certain embodiments, server 200 generates a compressed bitstream by encoding the compressed two-dimensional frames that represent the point cloud.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an electronic device 300 in accordance with an embodiment of this disclosure. The embodiment of the electronic device 300 shown in FIG. 3 is for illustration only, and other embodiments could be used without departing from the scope of this disclosure. The electronic device 300 can come in a wide variety of configurations, and FIG. 3 does not limit the scope of this disclosure to any particular implementation of an electronic device. In certain embodiments, one or more of the client devices 106-116 of FIG. 1 can include the same or similar configuration as electronic device 300. In certain embodiments, electronic device 300 can be an encoder and a decoder.

In certain embodiments, electronic device 300 is usable with data transfer, image or video compression, image or video decompression, encoding, decoding, and media rendering applications. The electronic device 300 can be a mobile communication device, such as, for example, a wireless terminal, a desktop computer (similar to desktop computer 106 of FIG. 1), a mobile device (similar to mobile device 108 of FIG. 1), a PDA (similar to PDA 110 of FIG. 1), a laptop (similar to laptop computer 112 of FIG. 1), a tablet (similar to tablet computer 114 of FIG. 1), a head-mounted display (similar to HMD 116 of FIG. 1), and the like.

As shown in FIG. 3, the electronic device 300 includes an antenna 305, a radio-frequency (RF) transceiver 310, a transmit (TX) processing circuitry 315, a microphone 320, and a receive (RX) processing circuitry 325. The electronic device 300 also includes a speaker 330, a one or more processors 340, an input/output (I/O) interface (IF) 345, an input 350, a display 355, and a memory 360. The memory 360 includes an operating system (OS) 361 and one or more applications 362.

The RF transceiver 310 receives, from the antenna 305, an incoming RF signal transmitted by another component on a system. For example, the RF transceiver 310 receives RF signal transmitted by a BLUETOOTH or WI-FI signal from an access point (such as a base station, Wi-Fi router, Bluetooth device) of the network 102 (such as a WI-FI®, BLUETOOTH®, cellular, 5G, LTE®, LTE-A®, WiMAX®, or any other type of wireless network). The RF transceiver 310 can down-convert the incoming RF signal to generate an intermediate frequency or baseband signal. The intermediate frequency or baseband signal is sent to the RX processing circuitry 325 that generates a processed baseband signal by filtering, decoding, or digitizing the baseband or intermediate frequency signal, or a combination thereof. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, digitizes, or a combination thereof, the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices and execute the OS 361 stored in the memory 360 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 is also capable of executing other applications 362 resident in the memory 360, such as decompressing and generating a received point cloud.

The processor 340 can execute instructions that are stored in a memory 360. The processor 340 can include any suitable number(s) and type(s) of processors or other devices in any suitable arrangement. For example, in some embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive, store, and timely instruct by providing image capturing and processing. The processor 340 can move data into or out of the memory 360 as required by an executing process. In some embodiments, the processor 340 is configured to execute the plurality of applications 362 based on the OS 361 or in response to signals received from eNBs or an operator. The processor 340 is also coupled to the I/O interface 345 that provides the electronic device 300 with the ability to connect to other devices, such as client devices 106-116. The I/O interface 345 is the communication path between these accessories and the processor 340.

The processor 340 is also coupled to the input 350. The operator of the electronic device 300 can use the input 350 to enter data or inputs into the electronic device 300. Input 350 can be a keyboard, touch screen, mouse, track-ball, voice input, or any other device capable of acting as a user interface to allow a user in interact with electronic device 300. For example, the input 350 can include voice recognition processing thereby allowing a user to input a voice command via microphone 320. For another example, the input 350 can include a touch panel, a (digital) pen sensor, a key, or an ultrasonic input device. The touch panel can recognize, for example, a touch input in at least one scheme among a capacitive scheme, a pressure sensitive scheme, an infrared scheme, or an ultrasonic scheme. For example, in the capacitive scheme, the input 350 can recognize touch or proximity. The input 350 can also include a control circuit. Input 350 can be associated with sensor(s) 365 and/or a camera by providing additional input to processor 340. As discussed in greater detail below, sensor 365 includes inertial sensors (such as accelerometers, gyroscope, and magnetometer), optical sensors, motion sensors, cameras, pressure sensors, heart rate sensors, altimeter, and the like. For example, input 350 can utilize motion as detected by a motion sensor, associated with sensor 365, as an input.

The processor 340 is also coupled to the display 355. The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. Display 355 can be sized to fit within a HMD. Display 355 can be a singular display screen or multiple display screens capable of creating a stereoscopic display. In certain embodiments, display 355 is a heads-up display (HUD).

The memory 360 is coupled to the processor 340. Part of the memory 360 could include a random access memory (RAM), and another part of the memory 360 could include a Flash memory or other read-only memory (ROM).

The memory 360 can include persistent storage (not shown) that represents any structure(s) capable of storing and facilitating retrieval of information (such as data, program code, and/or other suitable information on a temporary or permanent basis). The memory 360 can contain one or more components or devices supporting longer-term storage of data, such as a ready only memory, hard drive, Flash memory, or optical disc.

Electronic device 300 can further include one or more sensors 365 that meter a physical quantity or detect an activation state of the electronic device 300 and convert metered or detected information into an electrical signal. For example, sensor(s) 365 may include one or more buttons for touch input (located on the headset or the electronic device 300), one or more cameras, a gesture sensor, an eye tracking sensor, a gyroscope or gyro sensor, an air pressure sensor, a magnetic sensor or magnetometer, an acceleration sensor or accelerometer, a grip sensor, a proximity sensor, a color sensor (such as a Red Green Blue (RGB) sensor), a biophysical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, and the like. The sensor(s) 365 can further include a control circuit for controlling at least one of the sensors included therein. As will be discussed in greater detail below, one or more of these sensor(s) 365 may be used to control a user interface (UI), detect UI inputs, determine the orientation and facing the direction of the user for three-dimensional content display identification, etc. Any of these sensor(s) 365 may be located within the electronic device 300, within a secondary device operably connected to the electronic device 300, within a headset configured to hold the electronic device 300, or in a singular device where the electronic device 300 includes a headset.

As will be discussed in greater detail below, in this illustrative embodiment, electronic device 300 receives an encoded and compressed bitstream. The electronic device 300 decodes the compressed bitstream into multiple 2-D frames. In certain embodiments, the decoded bitstream also includes an occupancy map. The electronic device 300 decompresses the multiple 2-D frames. The multiple 2-D frames can include a frame that indicates coordinates of each point of a point cloud. A frame can include the location of each geometric point of the point cloud. For example, the frame can include a pictorial depiction of each geometric point of the point cloud as represented in 2-D. Another frame can include an attribute of each point such as color. The electronic device 300 can then generate the point cloud in three dimensions.

As will be discussed in greater detail below, in this illustrative embodiment, electronic device 300 can be similar to server 200 and encode a point cloud. The electronic device 300 can generate multiple 2-D frames that represent the geometry and texture or color or both of the point cloud. The point cloud can be mapped to the 2-D frame. For example, one frame can include the geometric points. In another example, another frame can include the texture or color or both of the point cloud. The electronic device 300 can compress the 2-D frames. The electronic device 300 can generate an occupancy map to indicate the location of valid pixels within each frame. The electronic device 300 can encode the frames to generate a compressed bitstream.

Although FIGS. 2 and 3 illustrate examples of devices in a computing system, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication networks, electronic devices and servers can come in a wide variety of configurations, and FIGS. 2 and 3 do not limit this disclosure to any particular electronic device or server.

Figure 4:
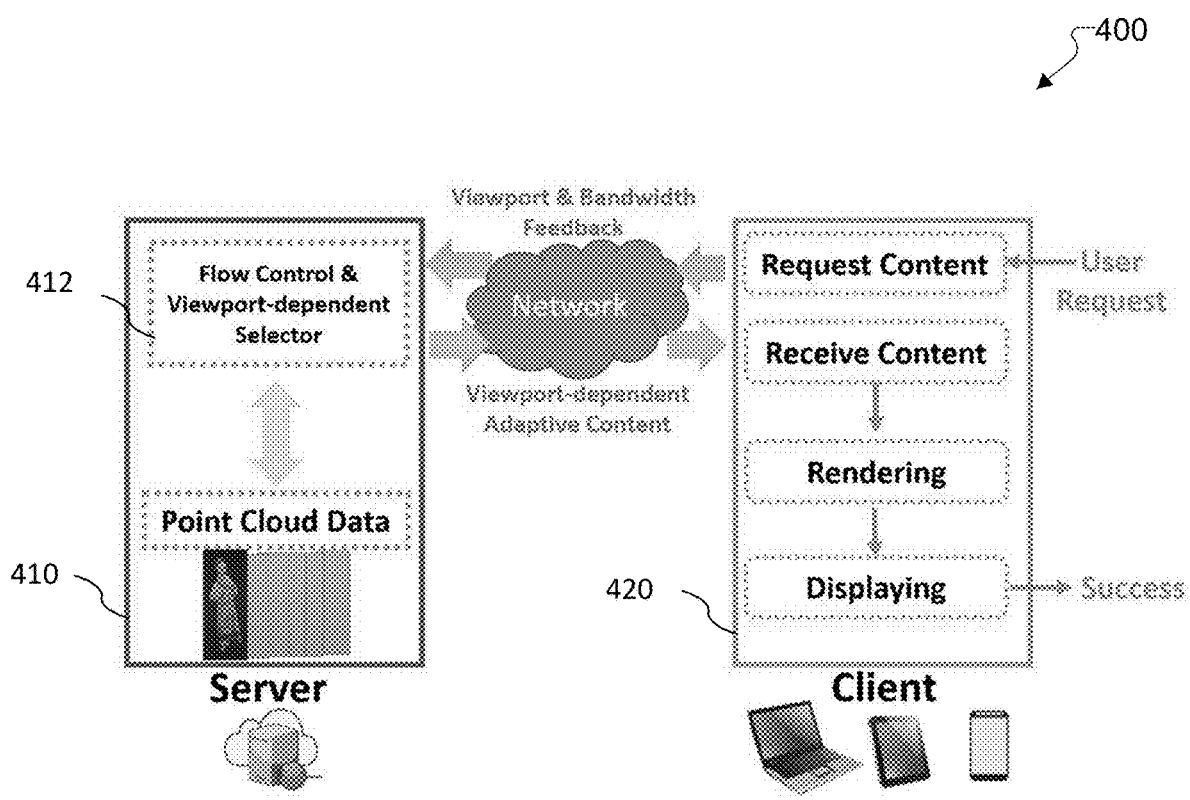
FIG. 4 illustrates an exemplary overview of a system 400 for a three-dimensional (3D) streaming service according to one embodiment of the present disclosure.

FIG. 4 illustrates an example overview of a system 400 for a three-dimensional (3D) streaming service according to one embodiment of the present disclosure. The embodiment shown in FIG. 4 is for illustration only. Other embodiments are used without departing from the scope of the present disclosure.

The system 400 includes a server that stores 3D point cloud data and provides efficient point cloud streaming to various client devices, e.g., a laptop, pad, smartphone, head-mounted display (HMD), eyeglass-based display and the like.

The client device 420 may be equipped with one or more sensors to detect a movement, position or orientation of a user's body (e.g., a head or eyes). The sensors may include, for example, inertial, multi-axis gyroscopic, or acceleration sensors. The client device tracks a user's head movement to determine where the user is looking, which correspond to a view field. The view field may refer to a field that is visible in three dimensional environment through the client device. The view field can be determined based on a viewport and viewpoint.

After completing the streaming session initialization between the client device 420 and the server 410, the client device 420 sends a feedback which includes information on at least one of a viewport, view field and/or available streaming session bitrate (or bandwidth). In one embodiment, the feedback also includes channel state information (CSI), and the serve can determine an available bitrate or bandwidth based on the channel state information.

The server 410 then starts to send point cloud data through the procedure called flow control and view field-dependent selector 412. This procedure is designed to select the point cloud data (nodes in Octree) based on the view field and bandwidth/CSI feedback. It also offers a flow control of the stream to maintain an appropriate bandwidth. Next, the client device 420 receives view field-dependent adaptive content, render the content and display it on the client device's screen. Finally, this procedure repeats continuously to offer a good streaming service to the user.

Immersive media is a term that is used to denote a type of media consumption experience, where the user is immersed into the content that a user is consuming. This can be achieved in multiple ways such as virtual reality, augmented reality, mixed reality, 6 degrees of freedom (6DoF), etc. The immersive experience results from the user being able to navigate the scene, looking at the content from different angles. In its simplest form, the user is able to look around in all directions (i.e., 360 degree video), providing 3 degrees of freedom along the yaw, pitch, and roll axes.

In 6DoF experience, the user is able to walk around the scene and look at each object from different angles, giving the user an impression of being immersed in that scene. In addition to that, AR and MR enable fusing that content with the real world through capturing the user's local environment and merging/enhancing it with the media content. However, the conventional immersive media system suffers from the following issues. When compared to traditional approaches, rendering is usually OpenGL-based and centralized, and 2D content is used as texture or background but still rendered through same engine. Scene graph is needed for the consumption of the media, and timeline issues not clear from architecture. No support for AR in this architecture. For instance, AR objects can be selected by user and placed in the scene. All processing happens at the receiver side, which results in tremendous processing requirements on the client device.

This disclosure provides systems and apparatus to enable consumption of immersive content on end devices. The immersive media systems offer fallback to a simplified or default rendering in case scene graph or description is not supported. Also, the systems adapt 6 degrees of freedom to client bandwidth and processing capabilities by down-converting it to simplified 6 degrees of freedom, 3 degrees of freedom, 360-degree video, or 2 dimensional (2D) video. This disclosure allows for the appropriate rendering of timed text information such as WebVTT on VR and 360 degree video. The disclosure allows for correct rendering that resolves issues with depth mismatch and with relative positioning to the video.

One of the features distinguished from traditional 2D architectures is that visual rendering is governed by a graphics engine that composites the different media resources to create the presentation. Audio may undergo a similar procedure in the rendering. In particular, the graphics engine will use tradition 2D content as texture for objects that are controlled by certain geometries. Physically-based rendering takes this approach to the extreme, where realistic light propagation, reflection/refraction patterns are mimicked with a high fidelity.

Most widely used graphics and game engines rely on an OpenGL core. They act as wrappers around OpenGL and offer more advanced functionality in a more abstract and simple use way to the developers.

When rendering VR/AR or 6DoF content, the rendering engine usually sets up a scene first. The scene maybe read from a scene graph/scene description document or it may be inferred from the content (e.g. a scene with a single Sphere geometry for 360-degree video). The client may be given option to choose between a full 6DoF scene rendering, it may opt for a simplified rendering, or it may delegate part of the scene rendering to the network. In the latter case, the network will convert a 6DoF scene into a simplified 6DoF scene, a 3DoF+ or 3DoF scene, or even into a 2D video.

The media resources of a content may be of a wide range of formats and types. They can either be 2D or 3D, natural or synthetic, compressed or uncompressed, provided by the content provider or captured locally (e.g., in the case of AR). MPEG should encourage the usage of MPEG formats (e.g., point cloud compression format) but should also allow for popular and widely used scene graph and media resources.

One of the issues for MPEG-I that remains is the presentation timeline management. The different resources may have an internal timeline for their presentation, such as samples in the Alembic format. The scene graph may have animations and other scripts that incur an internal media timeline. In addition, scene graphs should also be updateable in a 6DoF presentation, where updates are timed or event driven. Finally, the container format may also specify the media timeline for the presentation of the embedded media.

To deal with the timeline control issue, a careful organization of the different media timelines is required. A hierarchical arrangement will be suitable for all formats, where the container timeline will represent the top level, followed by the scene graph and the internal media timeline of the media resources. For media resources that have an internal media timeline, it may be possible to partially access and time each sample of an embedded media resource from the container format. As an example, Alembic samples may be mapped to container samples and associated with a timestamp for presentation.

On the other hand, a sample may be played back based on an event instead of a predetermined time. This implies that the timeline of the container may be split into sub-paths, of which the playback is decoupled and may be triggered by events or other sources.

3DoF and 3DoF+ rendering can be implemented by rendering of 2D planar media contents with some additional metadata, such as projections, view-points and depths/parallax. 6DoF media rendering will require several additional features to render new type of 3D volumetric media. Followings are a list of important features for 6DoF media rendering.

Synchronized rendering of 2D planar video and 3D volumetric video. As the type of display device for 6DoF media is a 2D planar display, 6DoF media will be a combination of the 2D planar video and the 3D volumetric video. In one embodiment, 3D volumetric video needs to be synchronously rendered with 2D planar video in time and 3D space by a single rendering engine. In addition, for interactive consumption, rendering according to 6 degree viewport is also needed.

Mixed rendering of natural and synthetic objects. In augmented reality (AR) or VR using 6DoF media, natural 3D volumetric objects are needed to be correctly placed in a 3D synthetic scene or vice versa. So, natural and synthetic 3D volumetric objects are needed to be correctly composited considering lighting and reflection effects by scene graph information, and should be rendered together by a single rendering engine for a single scene.

Smartphones and HMDs will be used as a device consuming 6DoF media in the near future when the MPEG-I standard will be deployed until pure 6DoF devices such as holographic displays are deployed in the market. To meet the power consumption requirements, complex 2D video decoder and graphic processing unit (GPU) can be implemented as a dedicated hardware, such as a single chip. Such a single chip includes a dedicated data bus between the modules, considering general application scenarios. Because of hardware limitations such as power consumption, size and so on, adding another computationally expensive module to process 3D natural volumetric video will not be feasible in the near future. Thus, a client device for processing 6DoF media may include a single 2D planar video decoder and a GPU. However, the client may include multiple 2D planar video decoders and GPUs for a higher rendering capability.

Remote dynamic/partial rendering: Rendering complete 3D volumetric scenes by a client device will not be feasible due to complexity and is not necessary as a user will only see some parts of it. In addition, as most of the display devices is equipped with a 2D planar monoscope/stereoscopic display, a client may need only a portion of an entire scene. Therefore, using a renderer remotely located and connected through high speed low delay network is useful. A client device will request and received partially rendered scene from a remote renderer and compose them with the locally rendered scene to generate final scene Considering the features to be supported for 6DoF media consumption and hardware implementations and the components of 6DoF media as described above, architectures for 6DoF media service are provided below with reference to figures.

Figure 5:
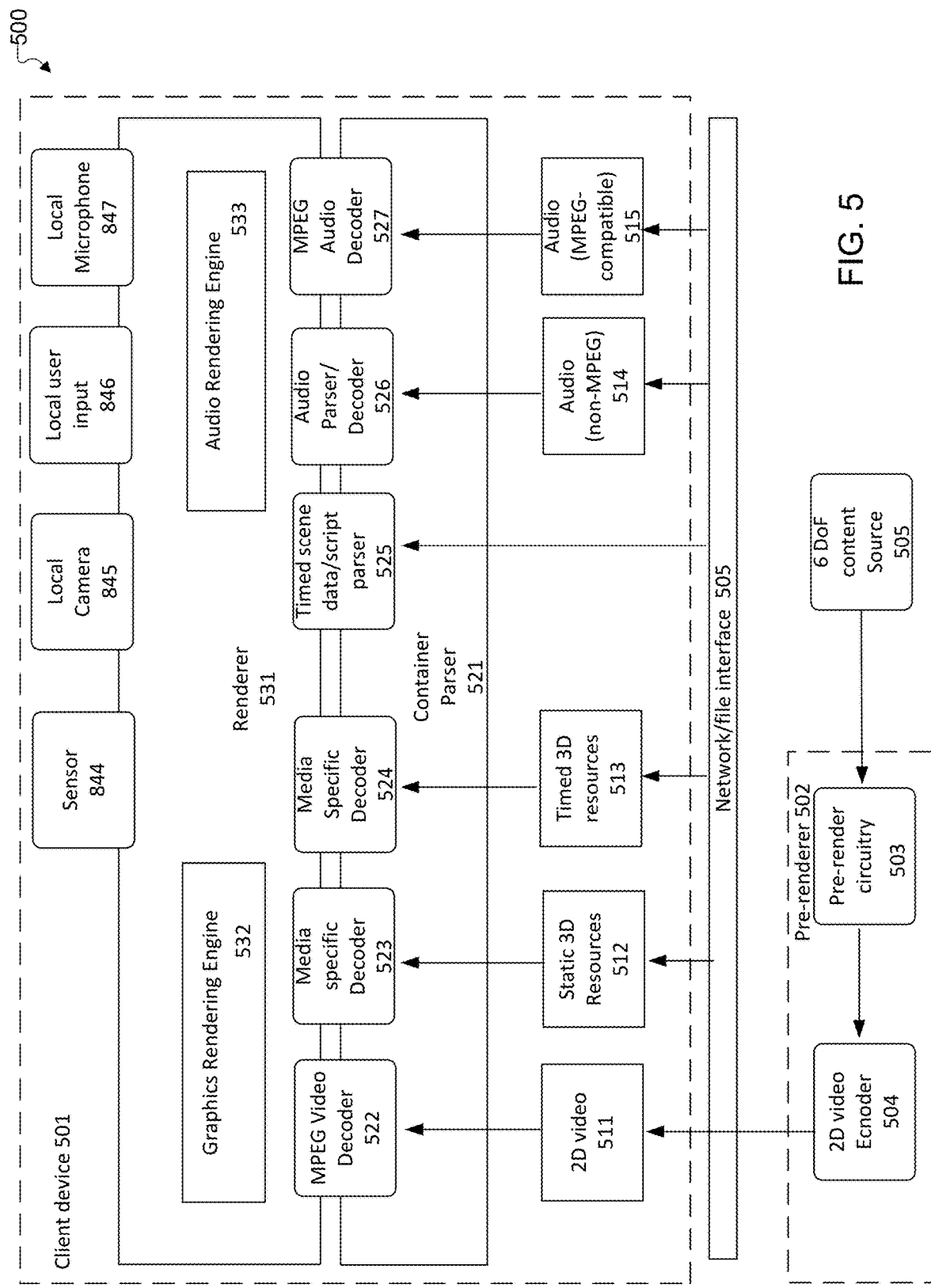
FIG. 5 illustrates an example diagram of a system device for rendering immersive media content according to one embodiment of the present disclosure.

FIG. 5 illustrates an example diagram of a client device for rendering immersive media content according to one embodiment of the present disclosure. The embodiment shown in FIG. 5 is for illustration only. Other embodiments are used without departing from the scope of the present disclosure.

The architecture of the system 500 accommodates inputs through different modalities to account for applications, such as 3DoF/6DoF and even AR/mixed reality (MR). The system 500 includes a client device 501 and a pre-renderer 502. The pre-renderer device 502 may be a local component in the client device 501 or may be located in the network as a separate entity.

The pre-rendering/simplification may be necessary for certain client devices that are limited in their processing capabilities or network resources. For example, 6DoF scenes are converted into simplified 6DoF scenes by reducing the amount of data in the scene restricting the viewing window, and/or restricting the movement in the scene. Objects and data that is occluded, too far away from the viewer, or not in the visible range of the viewer can be removed completely or reduced in size and complexity. In one embodiment, among XYZ coordinates of a 6DoF point, the X and Z coordinates of points are stored such that the Y coordinate can be determined from the row number of the pixel storing the X and Z coordinates within the 2D frame. The client device supports consuming the content in different forms. For example, a simplified 2D version may be rendered in simple client devices, a limited 3DoF, 3DoF+, or 6DoF version may also be consumed by the client device.

The pre-rendering/simplification operation can be performed in a pre-renderer 502 and a 2D video encoder 503. The pre-renderer 502 and the 2D video encoder 503 may be local components in the client device or may be located in the network as separate entities.

Pre-renderer 502 receives 6 DoF scene data from a network or a 3D content storage, and converts 6 DoF scenes into a lower level of DoF scenes, such as a 360 video or a 2D video at a server. In one embodiment, a pre-render 521 places a virtual 360 or 2D camera at the position of the viewer in the 6DoF scene and captures a 360 video or a 2D video. In another embodiment, the pre-renderer includes one or more processors configured to obtain a 6 degree of freedom (DoF) scene and generate one or more bitstreams by simplifying the 6 DoF scenes. The one or more bitstreams includes 2D video bitstreams including geometries and textures of each point of the 6DoF scene, 2D to 3D conversion metadata for rendering 3D voxels from 2D pixels; and scene description metadata for describing 6 DoF relationships among objects in the 6 DoF scene.

2D video encoder 503 encodes the lower level of DoF scenes, such as the 360 video or the 2D video by a codec, and outputs one or more bitstreams. The codec can include at least one of High Efficiency Video Coding (HEVC), HEVC Scalability Extension (SHVC), Advanced Video Coding (AVC), Scalable Video Coding (SVC), video compression (VP) 9, VP8 Joint Video Experts Team (JVET), oint Photographic Experts Group (JPEG), and the like. The one or more bitstreams include audio tracks such as non-MPEG audio or MPEG compatible audio, 2D video tracks including an MPEG compatible 360° video track. Also, the one or more bitstreams can include static 3D resources (PC, mesh, geometry, texture, attribute), and timed 3D resources (PC, mesh, geometry, texture, attribute). In addition, the one or more bitstreams can include timed scene data/scene script/script information.

The client device 501 includes a container parser 521, multiple video decoders 522, 523, 524, a script parser 525, multiple audio decoders 526, 527, renderer 531 and various inputs 544, 545, 546, 547.

The client device 501 receives one or more bitstreams can including static 3D resources (PC, mesh, geometry, texture, attribute), and timed 3D resources (PC, mesh, geometry, texture, attribute) from a network or file interface 505. The one or more bitstreams can also include timed scene data, scene script, and/or script information. This information may be used to describe the scene of a presentation.

The parser 521 extracts, from the one or more bitstreams, information about resources and media timeline as well as any embedded or referenced media resources, and makes them available at the presentation engine 505. The container parser distributes 2D video data 511 to a MPEG video decoder 512, static 3D resources 512 to a media-specific parser/decoder 513, timed 3D resources 513 to a media-specific parser/decoder 514, audio non-MPEG audio data 514 to audio decoder 516, MPEG compatible data 515 to a MPEG audio decoder 517. The script parser 525 parses timed scene information, scene graph information and shader information, and feeds the parsed information to the render 531. In one embodiment, a basic rendering operation may be described in the container format to support simple clients that do not support any of the included scene graph formats. Other scene description files such as scripts or shaders may also be included in the container/parser.

Decoded media resources are composited together in the render 531 to produce the presentation. The render 531 includes a graphics rendering engine 532 and an audio rendering engine 533. The graphics rendering engine 505 performs a rendering for visual content from the decoded 2D pixels and static and timed media resources. The graphics rendering engine 505 may compose 3D content out from 2D-content. One example is point clouds that are encoded using MPEG-encoded point cloud compression. The graphics Rendering Engine 503 can be built based on some graphics libraries such as OpenGL or WebGL or even some higher-level engines such as unity. The 2D/3D audio rendering engine 507 performs a rendering for audio content from decoded non-MPEG or MPEG compatible audio data.

The client device 501 can receive various inputs from a sensor 544, a local camera 545, a local user input 546, a local microphone 547, etc., for augmented reality (AR)/mixed reality (MR) applications.

Figure 6:
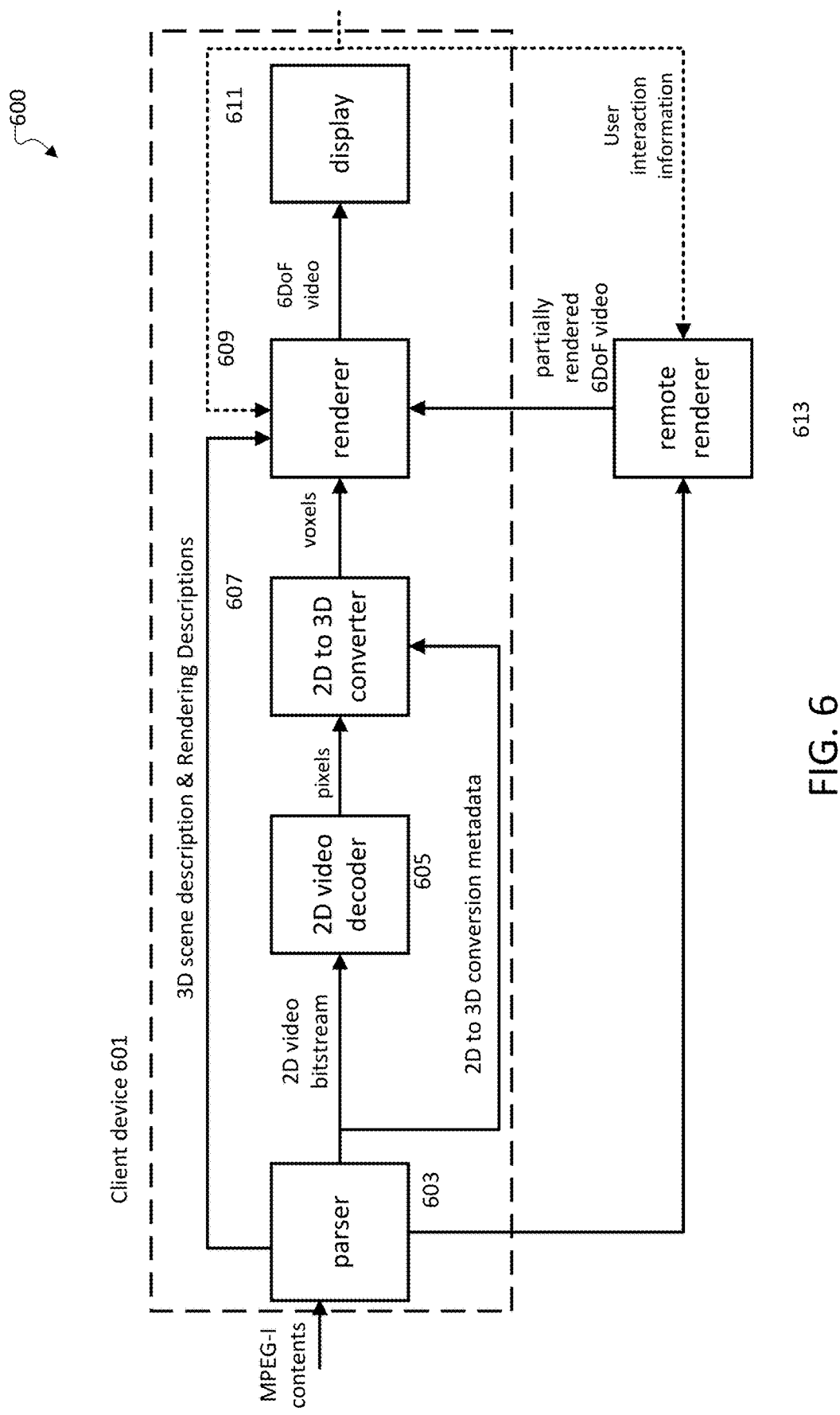
FIG. 6 illustrates another example diagram of a system for rendering immersive media content according to one embodiment of the present disclosure.

FIG. 6 illustrates another example diagram of a system 600 for rendering immersive media content according to one embodiment of the present disclosure. The embodiment shown in FIG. 6 is for illustration only. Other embodiments are used without departing from the scope of the present disclosure.

Client device 601 includes a parser 603, a 2D video decoder 605, 2D to 3D converter 607, a renderer 609, a display 611. In some embodiment, the client device 601 can communicate with a remote renderer 612 for a partial rendering process.

The client 601 receives a media content file from a server (not shown). The media content file can be streamed in a 6DoF MPEG-I format. The media content file can contain compressed multimedia data, such as one or more 2D planar video bitstreams, 2D planar video to 3D volumetric video conversion metadata, and 3D scene representation and rendering descriptions. In the media content file, 2D planar video to 3D volumetric video conversion metadata can be located either at the file level or inside 2D video bitstream as supplemental enhancement information (SEI) messages.

Parser 603 parses and extracts, from the media content file, 2D video bitstreams, 2D planar video to 3D volumetric video conversion metadata, and a scene representation and rendering descriptions. Each of the extracted data are described in detail below.

2D planar video bitstream is a bitstream for 2D planar decoder which is decoded to 2D pixel data where such 2D pixel data is used as a 2D planar video component of a 6DoF media, video texture for 3D geometry, or 2D planar representation of 3D volumetric video object. 2D video bitstream can include geometry frames and/or attribute frames. Geometry frames attribute frames may be streamed in one stream or different streams respectively. The geometry frames contain information on the geometric locations of each pixel of points. The geometry frames indicate the geometric locations in 2D frames. For example, the geometry frames indicate two of the three XYZ coordinates in such a way that the missing coordinate(s) can be determined. For instance, the Y coordinate is not stored on the geometry frames but the X and Z coordinates are stored such that the Y coordinate can be determined from the row number of the pixel storing the X and Z coordinates within the 2D gemoetry frames. Texture frames include attributes or textures of each point. The texture frames can include one or more of RGB color, material properties, intensity, quality, flags, and the like.

2D planner video to 3D volumetric video conversion metadata is to be used for reconstruction of 3D volumetric video objects such as point cloud or light field, from its 2D planar representation.

3D scene representation metadata include a tree structured logical model describing a 3D scene for a render module by describing 6 degree spatio-temporal relationships among the natural and synthetic objects in a scene. The scene description may be a list of scene description fragments, each scene description fragment corresponding to a particular node of the tree (dependency) structure.

Rendering description metadata include static and dynamic descriptions regarding the configuration and operation of a rendering process according to users' 6-degree viewport information.

After the parsing process, the parser 603 distributes the 2D video bitstreams to a 2D video decoder 605, the 2D planar video to 3D volumetric video conversion metadata to 2D to 3D converter 607, and the 3D scene representation metadata and rendering description metadata to a renderer 609. In one embodiment, the parser 603 also can deliver some data requiring a higher computing power or a specialized rendering engine to a remote renderer 612 for a partial rendering process.

2D video decoder 605 decodes the 2D planar video bitstreams including geometry frames and texture frames, and generates 2D pixel data. In one embodiment, the 2D video decoder 605 maps the geometries and textures in the 2D dimension to generate 2D pixels.

2D to 3D converter 607 converts the 2D pixel data to 3D voxel data by reconstructing 3D volumetric video objects using the 2D to 3D conversion metadata received from the parser module 605.

Renderer 609 receives the 3D voxel data, and renders 6DoF media content by arranging 3D objects in the 3D space using the 3D scene representation. In one embodiment, the renderer 609 can receive information on user interaction information from sensors, and determine which portion of 6DoF media to be rendered. Subsequently, the renderer 609 generates the determined portion of the 6DoF media using the 3D scene representation.

In one embodiment, the remote renderer 612 with a higher computing power or a specialized rendering engine can be used to produce partially rendered 6DoF media data. In such a case, the users' 6DoF viewport information is also delivered to the remote render module 612. Then, the renderer 612 combines a locally rendered 6DoF video with a remotely rendered 6DoF video to generate a final complete 6DoF video.

Figure 7:
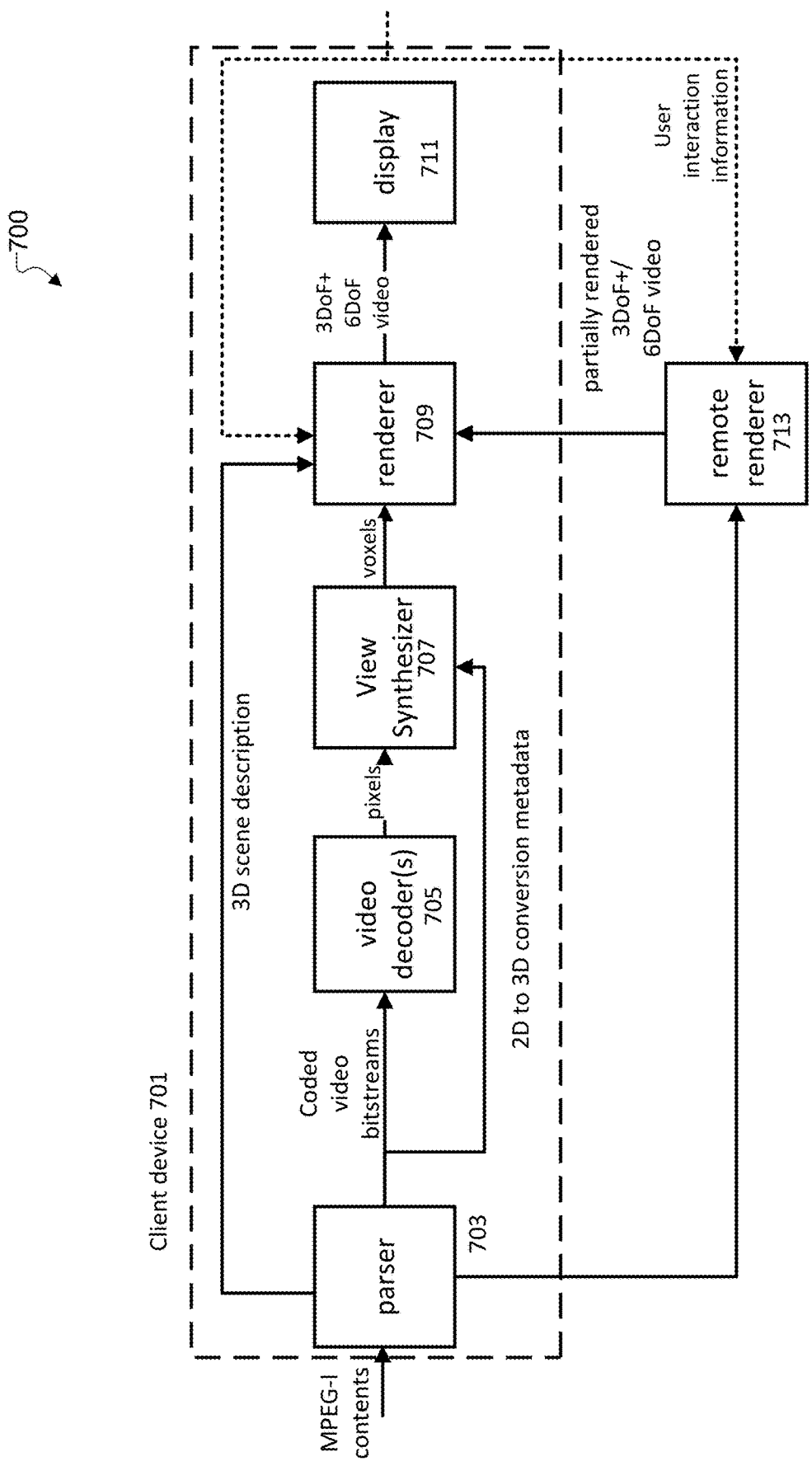
FIG. 7 illustrates yet another example diagram of a system for rendering three-dimensional (3D) content according to one embodiment of the present disclosure.

FIG. 7 illustrates still another example diagram of a system 700 for rendering immersive media content according to one embodiment of the present disclosure. The embodiment shown in FIG. 7 is for illustration only. Other embodiments are used without departing from the scope of the present disclosure.

The client device 701 is for rendering both of 3DoF and 6DoF media, while the client device 700 is focused on rendering 6DoF media. The rendering mechanism of the client device 700 is similar to that of the client device 500 described with reference to to FIG. 5.

The client device 701 includes a parser 703, a video decoder(s) 705, a view synthesizer 707, a renderer 709, a display 711. In some embodiment, the client device 501 can communicate with a remote renderer 713 for a partial rendering process.

The client device 701 receives a 3DoF and 6DoF media content file(s) from a server (not shown). The media content file can contain compressed 3DoF and 6DoF multimedia data, such as one or more 2D planar video bitstreams, 2D planar video to 3D volumetric video conversion metadata, and 3D scene representation and rendering descriptions.

Parser 703 parses and extracts, from the 3DoF and 6DoF media content file, 2D video bitstreams, 2D planar video to 3D volumetric video conversion metadata, and scene representation and rendering descriptions.

After the parsing process, the parser 703 distributes the 2D video bitstreams to the video decoder 705, the 2D planar video to 3D volumetric video conversion metadata to a view synthesizer 707, and the 3D scene representation metadata and rendering description metadata to a renderer 709. In one embodiment, the parser 703 also can deliver a portion of partial data to a remote renderer 513 with a higher computing power or a specialized rendering engine for partial rendering.

2D video decoder 705 decodes the 2D planar video bitstreams including geometry frames and texture frames, and generates 2D pixel data by mapping the geometries and textures in the 2D dimension.

View synthesizer 707 converts the 2D pixel data to 3D voxel data by reconstructing 3D volumetric video objects based on the 2D to 3D conversion metadata received from the parser module 505. Then, the view synthesizer 707 combines 3D voxel data of 3DoF objects and 6DoF objects in the same scene.

Renderer 709 receives the 3D voxel data, and renders 6DoF media content by arranging 3D objects in the 3D space using the 3D scene representation. In one embodiment, the renderer 709 can receive information on various user interaction information from sensors, and determine which portion of 3DoF and 6DoF media to be rendered. Subsequently, the renderer 709 generates the determined portion of the 3DoF and 6DoF media using the 3D scene representation.

In one embodiment, the remote renderer 713 can be used for producing a partially rendered 3DoF and 6DoF media video. In such a case, the user information is also delivered to the remote render module 512. Then, the renderer 709 combines a locally rendered 3DoF and 6DoF video with a remotely rendered 6DoF media to generate a final complete 3DoF and 6DoF video.

The renderer module 709 generates 3DoF+/6DoF media by using 3D voxel data or combination of 3D scene representation and 2D pixel data. If there are partially rendered 3DoF+/6DoF media data from a remote renderer module 713, then the renderer module 709 also combines such data with locally rendered 6DoF media to generate final 6DoF video.

User interaction information, such as a user's location, posture, direction or viewpoint, can be delivered to the parser 703, the video decoder 705, the view synthesizer 707 and the renderer 709, which are involved in processing of 3DoF+/6DoF media, to dynamically change a rendering portion of the data for the adaptive rendering process according to the user's information.

Figure 8:
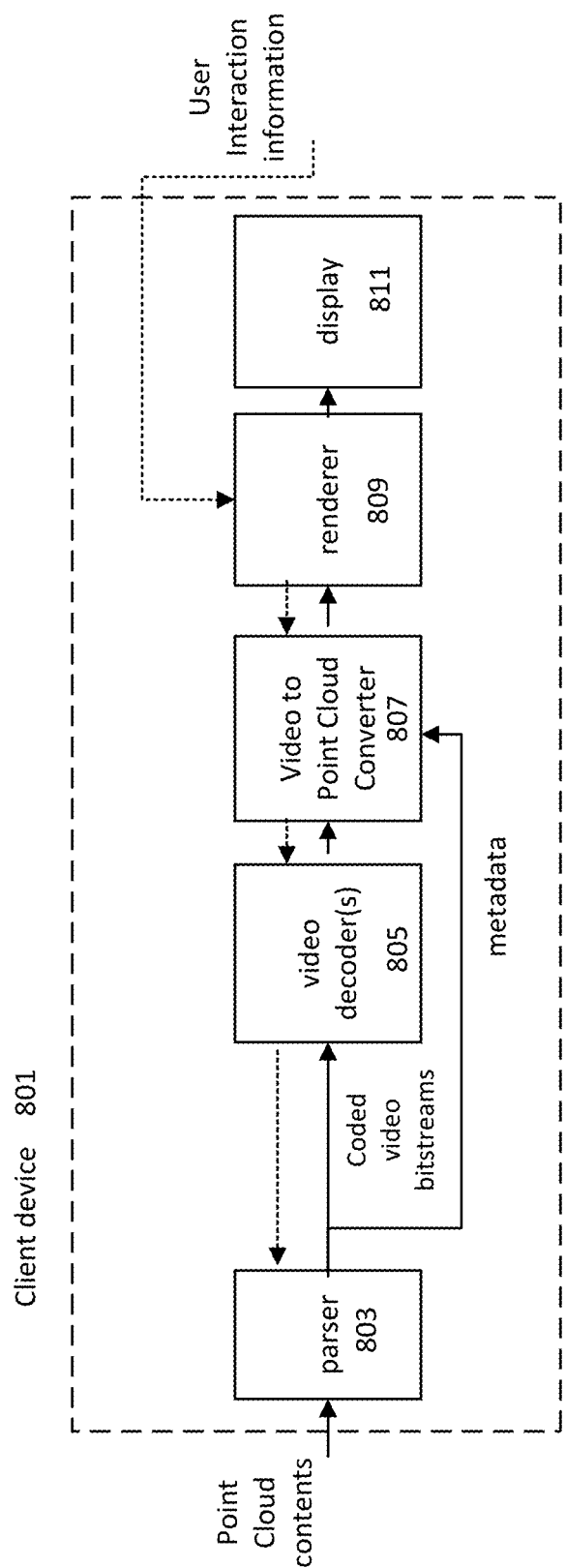
FIG. 8 illustrates yet another example diagram of a client device for rendering immersive media content according to one embodiment of the present disclosure.

FIG. 8 illustrates yet another example diagram of a client device for rendering immersive media content according to one embodiment of the present disclosure. The embodiment shown in FIG. 8 is for illustration only. Other embodiments are used without departing from the scope of the present disclosure.

Client device 801 is a rendering model for point cloud media as a specific instantiation of the 3DoF and 6DoF rendering model described with reference to FIG. 6. The rendering mechanism of the client device 801 is similar to that of the client device 601 and 701.

Client device 801 receives a point cloud media content file which is composed of two 2D planar video bitstreams and 2D planar video to 3D voluemetric video conversion metatdata. In the content, 2D planar video to 3D volumetric video conversion metadata can be located either at the file level as timed metadata track(s) or inside 2D video bitstream as SEI messages.

Parser 803 at the client device 801 reads the contents, and delivers two 2D video bitstreams to 2D video decoders 805 and 2D planar video to 3D volumetric video conversion metadata to video to point cloud converter 807.

2D video deconders 805 decodes 2D planar video bistreams to generate 2D pixel data. Then, 2D pixel data from 2D video decoders 805 are converted to 3D point cloud data by a video to point cloud converter 807 if necessary using the metadata received from the parser module. The video to point cloud converter 807 reconstructs 3D volumetric objects as point cloud, using the 2D to 3D conversion metadata.

Renderer 809 renders point cloud media by arranging the point cloud of 3D objects in the 3D spacer. If there are partially rendered point cloud media data from a remote renderer module, then the renderer 809 also combines such remotely rendered data with locally rendered point cloud media to generate a final point Cloud video.

User interaction inormation, such as user's location in 3D space or the direction and viewpoint of the user, can be delivered to the moduls involved in processing of point cloud media to dynamically change the portion of the data for adaptive rendering of content according to the user interaction information.

Figure 9:
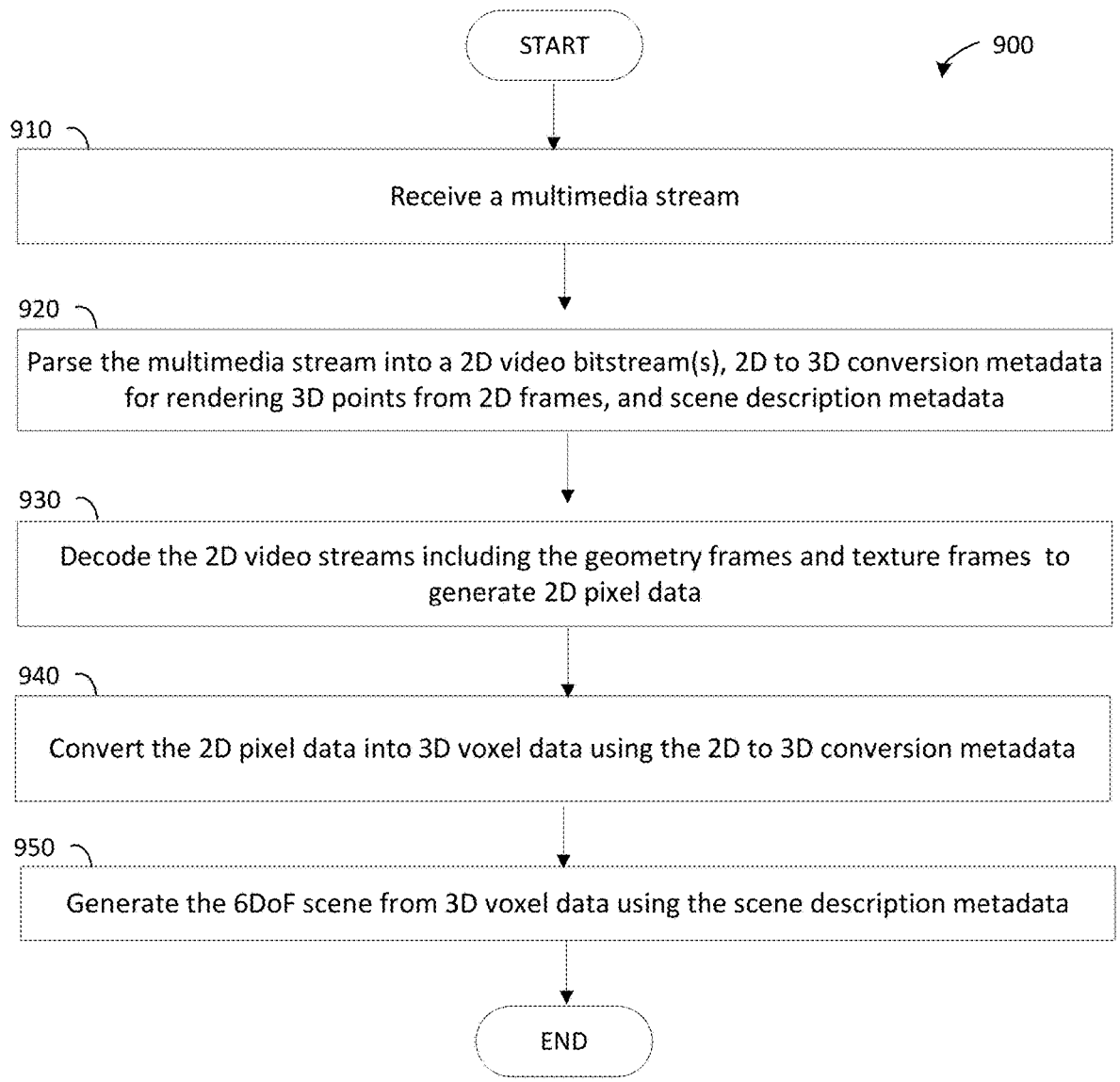
FIG. 9 illustrates an exemplary flow chart of a method 900 for rendering immersive media content.

FIG. 9 illustrates an exemplary flow chart of a method 900 for rendering immersive media content, as may be performed by a client device, according to one embodiment of the present disclosure. The embodiment of the method 900 shown in FIG. 9 is for illustration only. One or more of the components illustrated in FIG. 9 can be implemented in specialized processing circuitry configured to perform the noted functions or one or more of the components can be implemented by one or more processors executing instructions to perform the noted functions. Other embodiments are used without departing from the scope of the present disclosure.

As shown in FIG. 9, the method 900 begins at step 910. In step 910, the client device receives a multimedia stream from a network.

In step 920, the client device parses and extracts, from the 3DoF and 6DoF media content file, 2D video bitstreams, 2D planar video to 3D volumetric video conversion metadata, and scene representation and rendering descriptions. After the parsing process, the client device distributes the 2D video bitstreams to the video decoder, the 2D planar video to 3D volumetric video conversion metadata to a view synthesizer, and the 3D scene representation metadata and rendering description metadata to a renderer.

In step 930, the client device decodes the 2D video streams including the geometry frames and texture frames to generate 2D pixel data.

In step 940, the client device coverts the 2D pixel data to 3D voxel data by reconstructing 3D volumetric video objects using the 2D to 3D conversion metadata.

Subsequently, the client device generates the 6DoF scene from 3D voxel data using the scene description metadata.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus for rendering three-dimensional (3D) media content, the apparatus comprising:
   a communication interface configured to receive a multimedia stream; and
   one or more processors operably coupled to the communication interface, the one or more processors configured to:
      parse the multimedia stream into 2D video bitstreams including geometry frames and texture frames, 2D to 3D conversion metadata for rendering 3D points from 2D frames, and scene description metadata describing 6 degree of freedom (6DoF) relationships among objects in a 6DoF scene;
      decode the 2D video streams including geometry data and texture data to generate 2D pixel data;
      convert the 2D pixel data into 3D voxel data using the 2D to 3D conversion metadata; and
      generate the 6DoF scene from 3D voxel data using the scene description metadata.

2. The apparatus of claim 1, wherein 2D to 3D video conversion metadata is located either at a file level or inside the 2D video bitstreams as supplemental enhancement information (SEI) messages.

3. The apparatus of claim 1, wherein one or more processors are further configured to obtain user interaction information on a position or posture of the user in 3D space.

4. The apparatus of claim 3, wherein the one or more processors are further configured to select a portion of the 6DoF to be rendered based on the user interaction information.

5. The apparatus of claim 4, wherein the user interaction information indicates at least one of a location, posture, direction, or viewpoint of a user.

6. The apparatus of claim 4, wherein the one or more processors are further configured to parse the multimedia stream into rendering description metadata that include static and dynamic descriptions regarding a configuration of a rendering process.

7. The apparatus of claim 1, wherein the communication interface is further configured to transmit a portion of the 2D video bitstreams to a remote renderer for a partial rendering process.

8. The apparatus of claim 1, wherein the multimedia stream is generated by simplifying the 6DoF scene by lowering a degree of freedom (DoF) level of the 6DoF scene.

9. The apparatus of claim 8, wherein the DoF level of the 6DoF is lowered by placing a virtual 360 or 2D camera at a position of a viewer in the 6DoF scene and capturing a 360-degree video or a 2D video, respectively.

10. A method for rendering three-dimensional (3D) media content, comprising:
    receiving a multimedia stream;
    parsing the multimedia stream into 2D video bitstreams including geometry frames and texture frames, 2D to 3D conversion metadata for rendering 3D points from 2D frames, and scene description metadata describing 6 degree of freedom (6DoF) relationships among objects in a 6DoF scene;
    decoding the 2D video streams including the geometry frames and texture frames to generate 2D pixel data;
    converting the 2D pixel data into 3D voxel data using the 2D to 3D conversion metadata; and
    generating the 6DoF scene from 3D voxel data using the scene description metadata.

11. The method of claim 10, wherein 2D to 3D video conversion metadata is located either at a file level or inside the 2D video bitstreams as supplemental enhancement information (SEI) messages.

12. The method of claim 10, further comprising obtaining user interaction information on a position or posture of a user in 3D space.

13. The method of claim 12, wherein the user interaction information indicates at least one of a location, posture, direction, or viewpoint of a user.

14. The method of claim 12, further comprising:
    selecting a portion of the 6DoF to be rendered based on the user interaction information.

15. The method of claim 10, further comprising:
    parsing the multimedia stream into rendering description metadata that include static and dynamic descriptions regarding a configuration of a rendering process.

16. The method of claim 10, further comprising transmitting a portion of the 2D video bitstreams to a remote renderer for partial rendering.

17. The method of claim 10, wherein the multimedia stream is generated by simplifying the 6DoF scene by lowering a degree of freedom (DoF) level of the 6DoF scene.

18. The method of claim 17, wherein the DoF level of the 6DoF is lowered by placing a virtual 360 or 2D camera at a position of a viewer in the 6DoF scene and capturing a 360-degree video or a 2D video, respectively.

19. An apparatus for encoding three-dimensional (3D) content, comprising:
    one or more processors configured to:
       obtain data for a 6 degree of freedom (6DoF) scene;
       generate one or more bitstreams, by simplifying the data for the 6DoF scene, to include 2D video bitstreams including geometries and textures of each point of the 6DoF scene, 2D to 3D conversion metadata for rendering 3D voxels from 2D pixels, and scene description metadata for describing 6DoF relationships among objects in the 6DoF scene; and
    a communication interface operably coupled to the one or more processor, the communication interface configured to transmit the one or more bitstreams to a client device.

20. The apparatus of claim 19, wherein the encoded video data includes one of a 360-degree video or a 2D video.

* * * * *